United States Patent
Oi et al.

(10) Patent No.: US 8,560,136 B2
(45) Date of Patent: Oct. 15, 2013

(54) SYSTEM STABILIZING DEVICE

(75) Inventors: Kazunobu Oi, Tokyo (JP); Masakazu Muneshima, Tokyo (JP); Issei Hirayama, Tokyo (JP)

(73) Assignee: Meidensha Corporation, Tokyo (JP)

( * ) Notice: Subject to any disclaimer, the term of this patent is extended or adjusted under 35 U.S.C. 154(b) by 449 days.

(21) Appl. No.: 12/934,612

(22) PCT Filed: Apr. 1, 2009

(86) PCT No.: PCT/JP2009/056827
§ 371 (c)(1),
(2), (4) Date: Feb. 1, 2011

(87) PCT Pub. No.: WO2009/123268
PCT Pub. Date: Oct. 8, 2009

(65) Prior Publication Data
US 2011/0184571 A1    Jul. 28, 2011

(30) Foreign Application Priority Data
Apr. 2, 2008    (JP) .................................. 2008-095747

(51) Int. Cl.
G05D 11/00    (2006.01)

(52) U.S. Cl.
USPC ........................................... 700/292; 363/16

(58) Field of Classification Search
USPC ................ 700/287, 292, 293; 322/58; 363/16
See application file for complete search history.

(56) References Cited

U.S. PATENT DOCUMENTS

2006/0256586 A1*    11/2006    Ohshima et al. ................. 363/16

FOREIGN PATENT DOCUMENTS

| JP | 9-056170 | 2/1997 |
|---|---|---|
| JP | 10-014251 | 1/1998 |
| JP | 2007-020361 | 1/2007 |

OTHER PUBLICATIONS

Kojima et al., "Parallel Type Voltage Sag Compensator with Reduced Capacitor by Boost Type Power Factor Correction Rectifier", Institute of Electrical Engineers of Japan, Jan. 2005, vol. 125-B, No. 1, Japan.

* cited by examiner

Primary Examiner — Sean P. Schechtman
Assistant Examiner — Chad Rapp
(74) Attorney, Agent, or Firm — Foley & Lardner LLP (57) ABSTRACT

A system stabilizing device disposed in a micro grid incorporates a self-supporting control unit (200). The self-supporting control unit (200) allows a dq transforming unit (201) to determine an effective system voltage Vsd and an ineffective system voltage Vsq from a system voltage Vs. A fluctuation detecting unit (202) has differential characteristics and first-order lag characteristics, and determines the fluctuation component of the effective system voltage Vsd. This fluctuation component is multiplied by a gain in a proportional computing unit (203) to determine an ineffective current command $I_{refq}$. A fluctuation detecting unit (204) does not have differential characteristics, but has first-order lag characteristics, and determines the fluctuation component of the ineffective system voltage Vsq. This fluctuation component is multiplied by a gain in a proportional computing unit (205) to determine an effective current command $I_{refd}$. By so doing, hardware and computation load necessary for system stabilizing control during a self-supporting run can be reduced in the system stabilizing device.

2 Claims, 5 Drawing Sheets

SYSTEM STABILIZING DEVICE

TECHNICAL FIELD

This invention relates to a system stabilizing device, and is designed to reduce hardware and operation or computation load which are necessary for system stabilizing control during an isolated or self-supporting operation or run.

BACKGROUND ART

Power generation utilizing natural energy such as sunlight or wind power is generally susceptible to environmental influence, and the amount of power generation fluctuates greatly. A system stabilizing device is used for the purpose of accommodating or absorbing this fluctuation.

In a micro grid having a network constructed by installing a power source, such as natural energy, near the electric power demand side, the installation of a system stabilizing device, which keeps demand for and supply of electric power in balance, is necessary for system stabilization.

Figure 3:
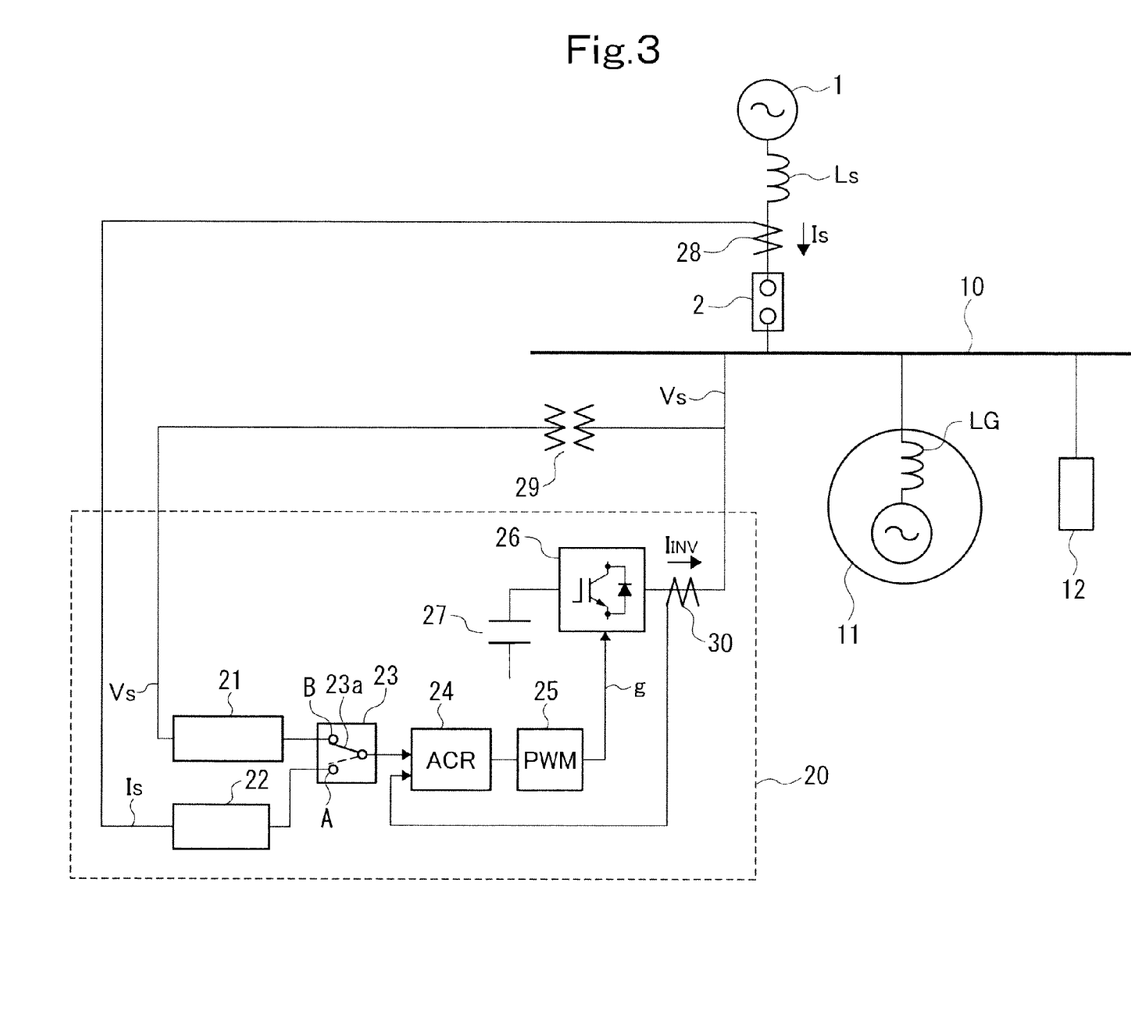
FIG. 3 is a circuit configuration diagram showing a micro grid equipped with a system stabilizing device.

An example of the micro grid (electric distribution or distribution system) equipped with a system stabilizing device will be described by reference to FIG. 3. FIG. 3 shows an example in which an existing superior power system (superior distribution system) 1 and a distribution system (micro grid) 10 are connected via a line impedance Ls and a circuit breaker 2.

A dispersed generation plant 11 and a load 12 are connected to the distribution system 10 which is the micro grid. The dispersed generation plant 11 is illustrated as a single generator in FIG. 3. Actually, however, it is composed of a plurality of dispersed facilities for power generation, which include natural energy type power generation equipment utilizing natural energy (e.g., photovoltaic power generation equipment or wind power generation equipment), and internal combustion engine type power generation equipment driven by an internal combustion engine (e.g., diesel power generation equipment). Also, the load 12 is actually a plurality of dispersed loads.

With the micro grid 10 shown in FIG. 3, the amount of power generation varies or fluctuates greatly according to weather conditions, wind speed, etc., because it has natural energy type power generation equipment.

In order to accommodate such fluctuations in the amount of power generation, therefore, a system stabilizing device 20 is used.

With the internal combustion engine type power generation equipment, output power is adjusted by governor control. However, governor control is slow in response. Thus, if electric power consumed by the load 12 suddenly changes, the internal combustion engine type power generation equipment cannot follow such a sudden change (sudden excess or deficiency) in electric power.

The system stabilizing device 20 is used for the purpose of following such a sudden change in electric power with good response, thereby assisting the internal combustion engine type power generation equipment to balance demand for and supply of electric power.

The system stabilizing device 20 is a power converter having a power storage function, and is provided in the distribution system 10 in a state connected in parallel with the dispersed generation plant 11 and the load 12.

The system stabilizing device 20 has a self-supporting control unit 21, an interconnected control unit 22, a change-over switch 23, a current control unit 24, a PMM (pulse width modulation) modulator 25, a power converter 26 capable of an inverting action and a converting or rectifying action, and a direct current charging unit 27 such as an electric double layer capacitor or a battery.

The power converter 26 acts responsive to a gate signal g fed from the PWM modulator 25. This power converter 26, when performing a converting action, converts an alternating current power obtained from the distribution system 10 into a direct current power, and charges this direct current power into the direct current charging unit 27. When performing an inverting action, the power converter 26 converts the direct current power charged in the direct current charging unit 27 into an alternating current power, and sends this alternating current power to the distribution system 10.

In the system stabilizing device 20, moreover, a system current Is, which flows from the power system 1 into the distribution system 10, is detected by a current detector 28, a system voltage Vs which is the voltage of the distribution system 10 is detected by a voltage detector 29, and an alternating current (AC) output current $I_{inv}$ outputted from the power converter 26 is detected by a current detector 30.

Under normal conditions where no breakdown or the like occurs in the power system 1, the circuit breaker 2 is in a connected state, so that "a system-interconnected run", an operation with the distribution system 10 being tied to the power system 1, is performed in the system stabilizing device 20. During the system-interconnected run, electric power is supplied to the load 12 by the power system 1, the dispersed generation plant 11, and the system stabilizing device 20.

During this system-interconnected run, a movable contact 23a of the change-over switch 23 is thrown to the A side as indicated by a dashed line in FIG. 3. As a result, the gate signal g obtained under control of the interconnected control unit 22 is fed to the power converter 26 to actuate the power converter 26.

During the above system-interconnected run, the system stabilizing device 20 acts to detect the system current Is flowing into the distribution system 10, determine a system power from the system current Is, and suppress a fluctuation in this system power. That is, the system stabilizing device 20 acts to detect a power flow at the point of interconnection between the distribution system (micro grid) 10 and the power system 1 and render fluctuations in the power flow gentle.

Under abnormal conditions where a breakdown occurs in the power system 1, on the other hand, the circuit breaker 2 is in a shut-off state, and the system stabilizing device 20 makes a "self-supporting run", a run performed with the distribution system 10 being cut off from the power system 1. During the self-supporting run, electric power is supplied to the load 12 by the dispersed generation plant 11 and the system stabilizing device 20.

During this self-supporting run, the movable contact 23a of the change-over switch 23 is thrown to the B side as indicated by a solid line in FIG. 3. As a result, the gate signal g obtained under control of the self-supporting control unit 21 is fed to the power converter 26 to actuate the power converter 26.

During the above self-supporting run, the system stabilizing device 20 detects the system voltage Vs within the distribution system 10, and performs a compensating action so that the voltage amplitude and frequency of this system voltage Vs become stable. The system stabilizing device 20 detects an excess or deficiency in the power within the distribution system (micro grid) 10, and exercises input or output control over the power. That is, the system stabilizing device 20 exercises such control as to charge surplus power into the direct current charging unit 27 when the power within the micro grid 10 is greater than the load power, and to output the charged power when the load power is insufficient.

Details of the actions of the system stabilizing device 20 during the self-supporting run will be described by reference to FIG. 4.

During the self-supporting run, power is supplied from the dispersed generation plant 11 to the load 12. When the power load sharply increases at this time, the torque of the generator becomes insufficient for the load power, so that the number of revolutions decreases to lower the frequency of the voltage.

Governor control for maintaining the frequency of output voltage at a constant value is applied to the internal combustion engine type power generation equipment. However, governor control is slow in response, so that if the load sharply increases, a decrease in the frequency lasting for several seconds or so occurs. As noted here, a load change (sharp increase in load) causes a great change to the frequency (frequency decrease). According to this change, other power generation equipment within the micro grid 10 also increases in load, and governor control is performed for the other power generation equipment. It follows that governor control is exercised in a plurality of power generation equipment. If such a plurality of governor controls interfere with each other, oscillations, etc. occur in the system voltage, rendering power supply from the dispersed generation plant 11 to the load 12 unstable.

Under this situation, upon detection of a decrease in the frequency of the system voltage Vs, the system stabilizing device 20 outputs an effective or active power to assist governor control effected by the internal combustion engine type power generation equipment, keeping a decrease in frequency to a minimum.

If the load increases, a voltage drop in the system voltage Vs is aroused by an armature reaction L within the generator of the power generation equipment.

Under this situation, upon detection of a voltage drop in the system voltage Vs, the system stabilizing device 20 acts as a capacitor load, that is, outputs a reactive power, to cancel out the voltage drop in an armature inductance LG, thereby suppressing the voltage drop in the system voltage Vs.

By performing the above-mentioned two types of actions, the system stabilizing device 20 suppresses fluctuations in the frequency and amplitude (voltage value) of the system voltage Vs to improve power quality.

Figure 4:
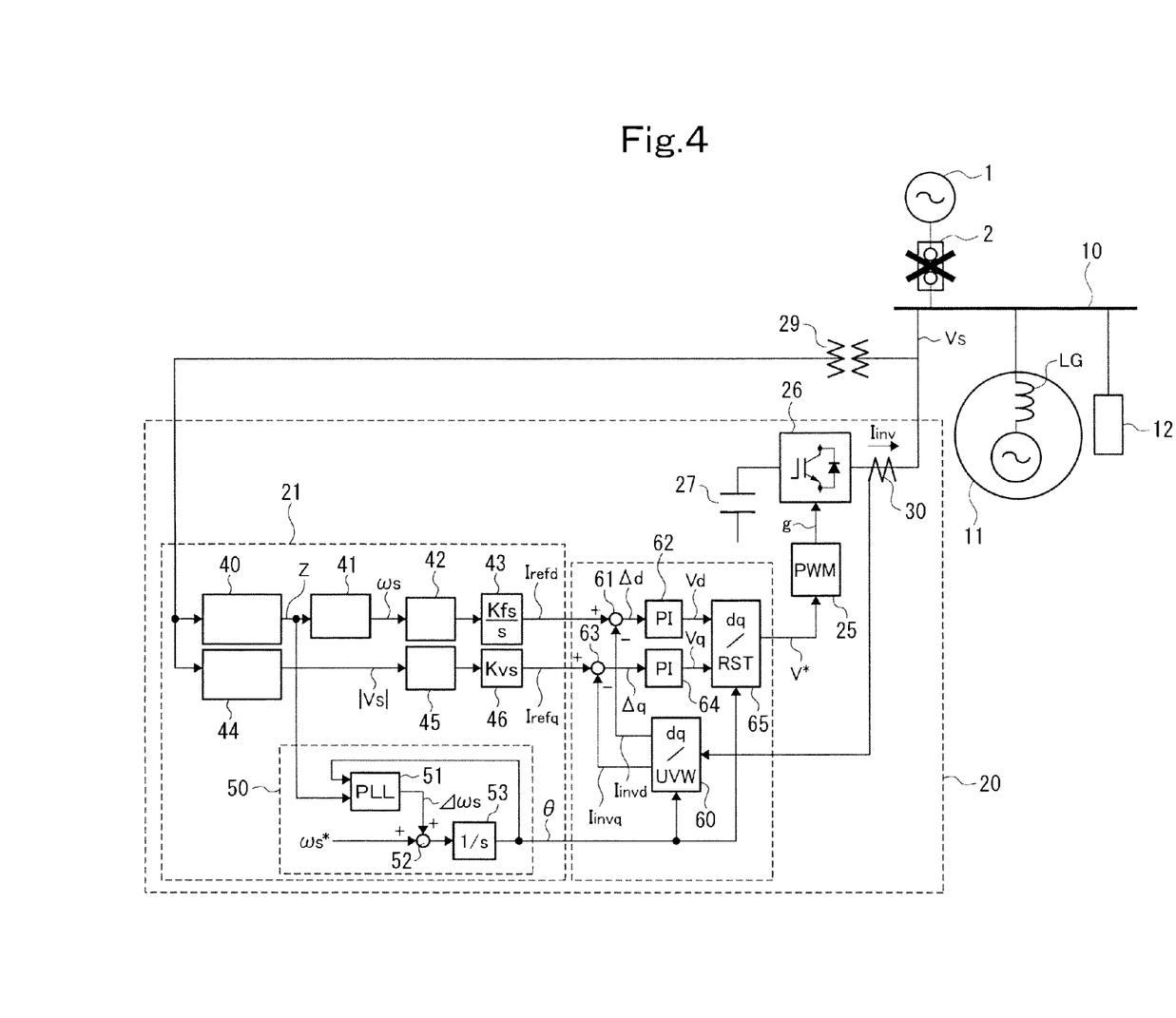
FIG. 4 is a circuit configuration diagram showing the micro grid equipped with the system stabilizing device.

By further reference to FIG. 4, explanations will be offered for the configurations and actions of respective functional blocks which act during the self-supporting run among the respective functional blocks of the system stabilizing device 20.

A zero-crossing detecting unit 40 takes in the system voltage Vs detected by the voltage detector 29, and outputs a zero-crossing signal Z showing the interval between the zero-crossings of its sinusoidal waveform. A frequency converting unit 41 outputs a frequency signal $\omega s$ showing the frequency of the system voltage Vs based on the zero-crossing signal Z.

A fluctuation detecting unit 42 determines the fluctuation component of the frequency signal $\omega s$, and this fluctuation component is integrated by an integrator 43 to determine an effective current command $I_{refd}$.

A voltage amplitude detecting unit 44 takes in the system voltage Vs detected by the voltage detector 29, and outputs a voltage amplitude signal |Vs| showing its voltage value.

A fluctuation detecting unit 45 determines the fluctuation component of the voltage amplitude signal |Vs|, and this fluctuation component is multiplied by a predetermined gain by a proportional computing unit 46 to determine an ineffective current command $I_{refq}$.

A PLL (phase-locked loop) circuit 50 is composed of a PLL computing unit 51, an adder 52, and an integrator 53.

This PLL circuit 50 outputs a control reference phase $\theta$. The PLL computing unit 51 receives the zero-crossing signal Z and the control reference phase $\theta$, and outputs a frequency difference $\Delta\omega s$. The adder 52 adds the frequency difference $\Delta\omega s$ and a reference angular frequency $\omega s^*$, and the resulting sum ($\Delta\omega s+\omega s$) is integrated by the integrator 53 to output the control reference phase $\theta$.

With this control reference phase $\theta$ as a phase reference, the transforming actions of a dq transformer 60 and a dq inverse transformer 65 to be described later are performed.

The dq transformer 60 carries out dq transformation of the AC output current $I_{inv}$ detected by the current detector 30 to output the effective component $I_{invd}$ of the AC output current and the ineffective component $I_{invq}$ of the AC output current.

A subtracter 61 outputs the effective component $\Delta d$ of a current deviation which is a deviation between the effective current command $I_{refd}$ and the effective component $I_{invd}$ of the AC output current. A current control unit (ACR) 62 performs the PI (proportional plus integral) computation of the effective component $\Delta d$ of the current deviation to output an effective voltage command Vd.

A subtracter 63 outputs the ineffective component $\Delta q$ of a current deviation which is a deviation between the ineffective current command $I_{refq}$ and the ineffective component $I_{invq}$ of the AC output current. A current control unit (ACR) 64 performs the PI (proportional plus integral) computation of the ineffective component $\Delta q$ of the current deviation to output an ineffective voltage command Vq.

The dq inverse transformer 65 carries out the dq inverse transformation of the effective voltage command Vd and the ineffective voltage command Vq to output a voltage command V*.

The PWM (pulse width modulation) modulator 25 PWM-modulates the voltage command V* to produce the gate signal g, and the power converter 26 acts in response to this gate signal g.

As a result, when the frequency signal $\omega s$ declines, power compensation is made such that effective power is outputted from the power converter 26, or when the voltage amplitude signal |Vs| declines, power compensation is made such that reactive power is outputted from the power converter 26.

As shown in FIG. 4, the system voltage Vs at the point of connection between the micro grid 10 and the power system 1 is detected to detect the interval between the zero-crossings of the sinusoidal waveform. In the case of this mode, a delay of one period occurs during detection of the frequency. As a result, a control gain cannot be set at a high value. This poses the problem that compensation is insufficient, resulting in a great frequency fluctuation.

As a measure for correcting a deficiency in compensation due to such a delay in the detection period for the frequency, a conventional technology is available which speeds up frequency detection by determining the vector of voltage from the instantaneous value of a three-phase AC voltage, instead of determining the zero-crossings of the voltage waveform, and further utilizing PLL (phase-locked loop) computation.

A self-supporting control unit of a system stabilizing device using such a conventional technology for speeding up frequency detection will be described by reference to FIG. 5.

Figure 5:
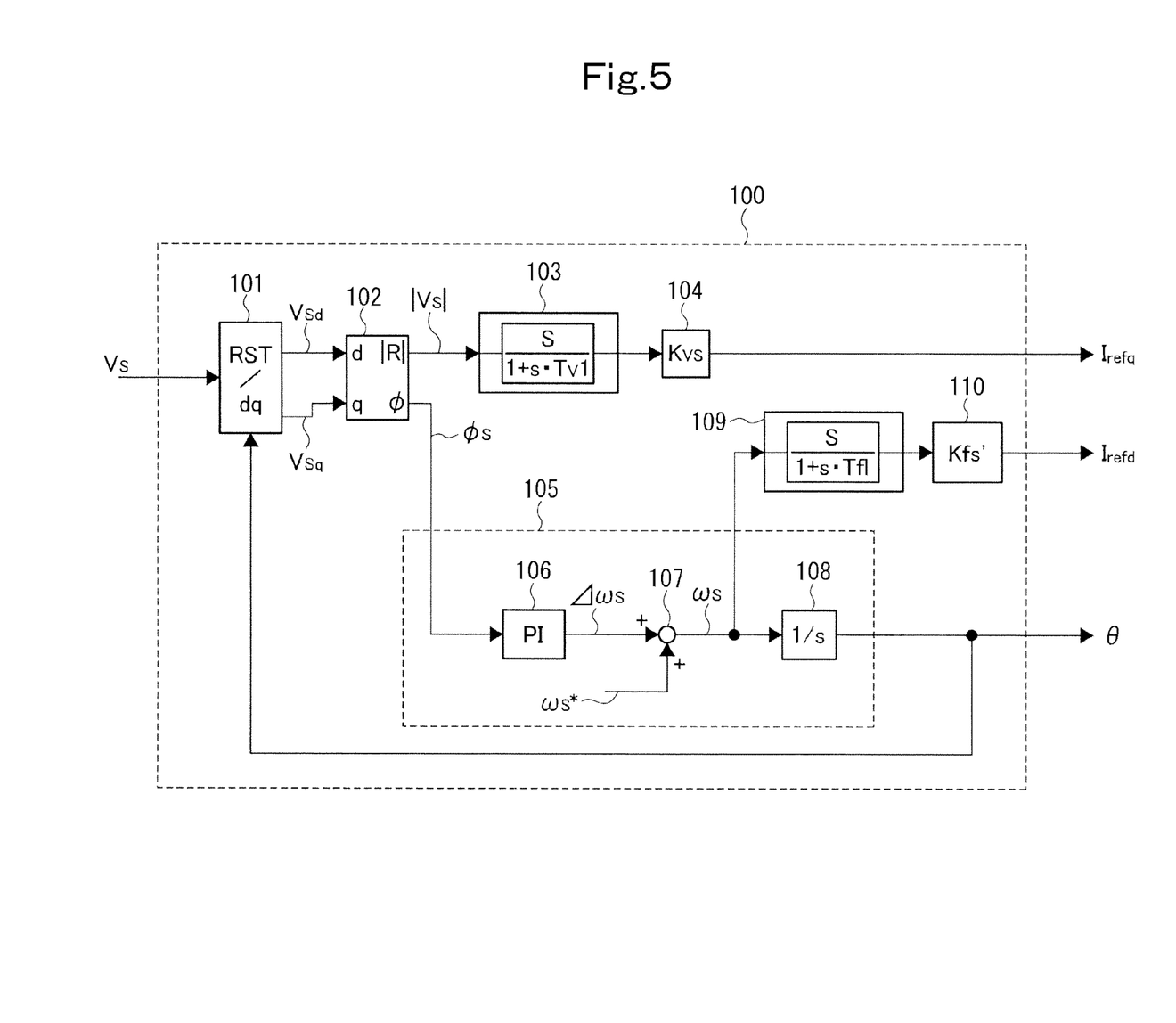
FIG. 5 is a circuit configuration diagram showing the conventional self-supporting control unit.

With a self-supporting control unit 100 shown in FIG. 5, a dq transforming unit 101 dq-transforms a three-phase system voltage Vs to output an effective system voltage Vsd and an ineffective system voltage Vsq of a rotating coordinate system. A polar coordinate transformation unit 102 performs the polar coordinate transformation of the effective system voltage Vsd and the ineffective system voltage Vsq to output a voltage amplitude signal |Vs| and a phase difference signal φs showing the phase difference of the system voltage Vs with respect to the control reference phase θ.

A fluctuation detecting unit 103 is a filter having differential characteristics and first-order lag characteristics, and outputs the fluctuation component of the voltage amplitude signal |Vs|. This fluctuation component is multiplied by a predetermined gain by a proportional computing unit 104 to determine the ineffective current command $I_{refq}$.

A PLL (phase-locked loop) circuit 105 is composed of a proportional plus integral (PI) computing unit 106, an adder 107, and an integrator 108.

The proportional plus integral (PI) computing unit 106 performs the PI (proportional plus integral) computation of the phase difference signal φs of the rotating coordinate system to output a frequency difference Δωs of the rotating coordinate system. The adder 107 adds the frequency deviation Δωs of the rotating coordinate system and a reference angular frequency ωs* of a fixed coordinate system to output an estimated frequency ωs. The integrator 108 integrates the estimated frequency ωs to output the control reference phase θ.

A fluctuation detecting unit 109 is a filter having differential characteristics and first-order lag characteristics, and outputs the fluctuation component of the estimated frequency ωs. This fluctuation component is multiplied by a predetermined gain by a proportional computing unit 110 to determine the effective current command $I_{refd}$.

PRIOR ART DOCUMENTS

Patent Document

Patent Document 1: JP-A-10-14251

Non-Patent Document

Non-Patent Document 1: A paper from The Institute of Electrical Engineers of Japan, January 2005, Volume 125-B, Number 1 "Parallel Type Voltage Sag Compensator with Reduced Capacitor by Boost Type Power Factor Correction Rectifier".

SUMMARY OF THE INVENTION

Problems to be Solved by the Invention

The self-supporting control unit 100 according to the conventional technology, shown in FIG. 5, has been confronted with the following problems:

(1) Since the polar coordinate transformation unit 102 is present, the problem arises that the amount of computation for polar coordinate transformation increases, imposing a heavy computation load in digitizing control.

(2) Attention will be paid to the computation route for determining the effective current command $I_{refd}$. The phase difference signal φs is "integrated" by the proportional plus integral computing unit 106 to determine the frequency difference Δωs. This frequency difference Δωs is "differentiated" by the fluctuation detecting unit 109, and the result is multiplied by the predetermined gain to determine the effective current command $I_{refd}$. That is, there has been redundancy of computation, i.e., the "integral" computation, followed by the "differential" computation, for restoring the initial state.

In digitizing control, moreover, the "differential" computation results in the cancellation of significant digits. Thus, it is necessary to provide a large number of significant digits. In this connection, the problem exists that a computation load is heavy.

The present invention has been accomplished in the light of the above-described conventional technologies. It is an object of the invention to provide a system stabilizing device capable of reducing the computation load in the self-supporting control unit.

Means for Solving the Problems

A constitution of the present invention for solving the above problems is a system stabilizing device provided in a distribution system to which a dispersed generation plant and a load are connected, the system stabilizing device having a control mode for a self-supporting run, the control mode being such that as a frequency of a system voltage of the distribution system fluctuates, compensation for an active power supplied to the distribution system is made, and as a voltage amplitude of the system voltage of the distribution system fluctuates, compensation for a reactive power supplied to the distribution system is made, the system stabilizing device comprising:
a self-supporting control unit which, in accordance with a fluctuation in the frequency of the system voltage, outputs an effective current command for suppressing the fluctuation in the frequency, and in accordance with a fluctuation in the voltage amplitude of the system voltage, outputs an ineffective current command for suppressing the fluctuation in the voltage amplitude; and
a power converter which performs a converting action and an inverting action in accordance with a gate signal obtained based on the effective current command and the ineffective current command, the self-supporting control unit being composed of:
a dq transformer which performs dq transformation of the system voltage to output an effective system voltage and an ineffective system voltage;
a first fluctuation detecting unit which is composed of a filter having differential characteristics and first-order lag characteristics and detects a fluctuation component of the effective system voltage;
a first proportional computing unit which multiplies the fluctuation component of the effective system voltage by a gain to output the ineffective current command;
a second fluctuation detecting unit which is composed of a filter having only first-order lag characteristics without having differential characteristics and detects a fluctuation component of the ineffective system voltage; and
a second proportional computing unit which multiplies the fluctuation component of the ineffective system voltage by a gain to output the effective current command.

Another constitution of the present invention is a system stabilizing device provided in a distribution system to which a dispersed generation plant and a load are connected, the system stabilizing device having a control mode for a self-supporting run, the control mode being such that as a frequency of a system voltage of the distribution system fluctuates, compensation for an active power supplied to the distribution system is made, and as a voltage amplitude of the system voltage of the distribution system fluctuates, compensation for a reactive power supplied to the distribution system is made, the system stabilizing device comprising:
a self-supporting control unit which, in accordance with a fluctuation in the frequency of the system voltage, outputs an effective current command for suppressing the fluctuation in the frequency, and in accordance with a fluctuation in the voltage amplitude of the system voltage, outputs an ineffective current command for suppressing the fluctuation in the voltage amplitude; and a power converter which performs a converting action and an inverting action in accordance with a gate signal obtained based on the effective current command and the ineffective current command, wherein the self-supporting control unit carries out computations using computing programs in such a manner as to:

perform a computation for dq-transforming the system voltage to determine an effective system voltage and an ineffective system voltage;

subject the effective system voltage to filtering, which involves a differential computation and a first-order lag computation, to determine a fluctuation component of the effective system voltage, and further perform a computation for multiplying the fluctuation component of the effective system voltage by a gain to determine the ineffective current command; and subject the ineffective system voltage to filtering, which involves a first-order lag computation, to determine a fluctuation component of the ineffective system voltage, and further perform a computation for multiplying the fluctuation component of the ineffective system voltage by a gain to determine the effective current command.

Effects of the Invention

According to the present invention, in determining the effective current command, redundancy of computation, i.e., the "integral" computation, followed by the "differential" computation, for restoring the initial state, is eliminated. Consequently, the hardware configuration can be downsized, and the computation load can be reduced. Simultaneously, computation by polar coordinate transformation can be cut down.

Further, in digitizing control (concretely, in exercising control by software processing using a computing program), cancellation of significant digits does not occur, because the "differential" computation can be omitted. In digitizing polar coordinate computation (concretely, in exercising control by software processing using a computing program), computation of $\tan^{-1}$ has to make preparations for solutions to inputs by use of a table. In the present embodiment, however, polar coordinate computation is unnecessary. Thus, the computation load can be lessened, and digitization can be performed easily.

MODE FOR CARRYING OUT THE INVENTION

A Mode for carrying out the present invention will be described in detail based on an embodiment of the invention.

Embodiment 1

Figure 1:
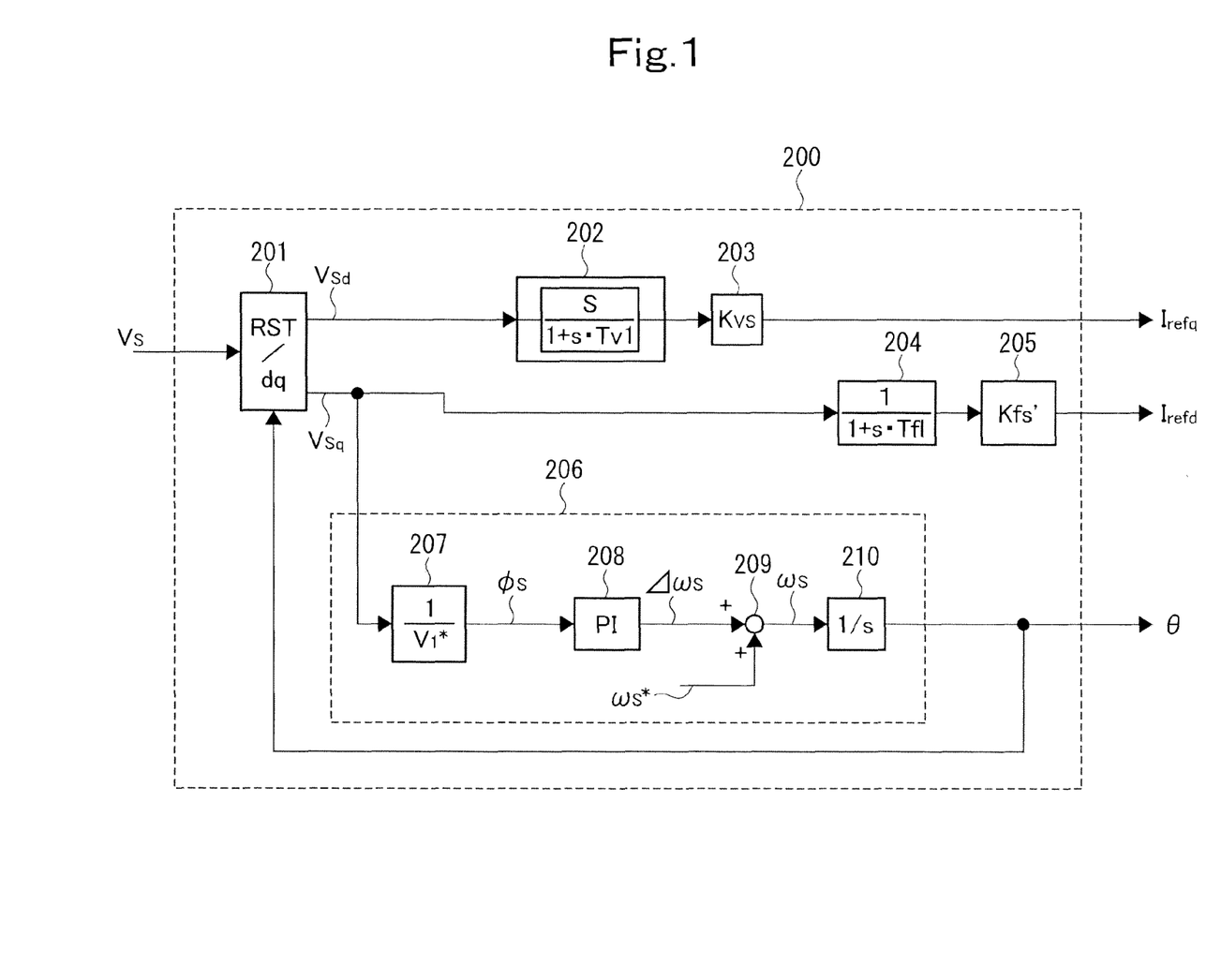
FIG. 1 is a circuit configuration diagram showing a self-supporting control unit according to an embodiment of the present invention.

FIG. 1 shows a self-supporting control unit 200 according to the embodiment of the present invention. The self-supporting control unit 200 is used instead of the self-supporting control unit 21 in the system stabilizing device 20 shown in FIG. 4.

As shown in FIG. 1, a dq transforming unit 201 of the self-supporting control unit 200 dq-transforms the three-phase system voltage Vs to output an effective system voltage Vsd and an ineffective system voltage Vsq of a rotating coordinate system. A fluctuation detecting unit 202 is a filter having differential characteristics and first-order lag characteristics, and outputs the fluctuation component of the effective system voltage Vsd. This fluctuation component is multiplied by a predetermined gain by a proportional computing unit 203 to determine an ineffective current command $I_{refq}$.

When a PLL action by a PLL circuit 206 to be described later is performed, the voltage amplitude signal |Vs| in a steady state is nearly equal to the effective system voltage Vsd as shown in the following equation:

$$|Vs|=(Vsd^2+Vsq^2)^{1/2} \approx Vsd$$

With attention being paid to the presence of such a relation, the example of FIG. 5 has determined the ineffective current command $I_{refq}$ by multiplying the fluctuation component of the voltage amplitude signal |Vs| by the predetermined gain. In the present embodiment, however, the fluctuation component of the effective system voltage Vsd is multiplied by a predetermined gain to determine the ineffective current command $I_{refq}$.

A fluctuation detecting unit 204, which is composed of a filter having only first-order lag characteristics without having differential characteristics, filters the ineffective system voltage Vsq to output the fluctuation component of the ineffective system voltage Vsq. This fluctuation component is multiplied by a predetermined gain by a proportional computing unit 205 to determine the effective current command $I_{refd}$.

A phase difference signal $\phi s$ (see FIG. 5) can be expressed by the following equation:

$$\phi s = \tan^{-1}(Vsq/Vsd)$$

When the PLL action by the PLL circuit 206 to be described later is performed, it can be considered that Vsq≈0 in a steady state. Thus, the phase difference signal $\phi s$ can be expressed by the following equation:

$$\phi s \approx Vsq/Vsd$$

If it is assumed that the voltage amplitude does not fluctuate greatly (a fluctuation of the order of within ±10% of the rating), an approximation can be made that the effective system voltage Vsd is nearly equal to a rated voltage amplitude V1*. Thus, the relation $$\phi s \approx Vsq/V1^*$$

is obtained.

With the above relation $\phi s \approx Vsq/V1^*$ being given attention, in the example of FIG. 5, the phase difference signal $\phi s$ is "integrated" by the proportional plus integral computing unit 106, then subjected to "differentiation" and first-order lag processing by the fluctuation detecting unit 109, and multiplied by the predetermined gain in the proportional computing unit 110 to determine the effective current command $I_{refd}$.

According to the present embodiment, on the other hand, the irrationality, namely, "integration" followed by "differentiation", is eliminated, and the fluctuation component of the effective system voltage Vsd is detected by the fluctuation detecting unit 204. This fluctuation component is multiplied by the predetermined gain in the proportional computing unit 205 to determine the effective current command $I_{refd}$.

The PLL (phase-locked loop) circuit 206 is composed of a divider 207, a proportional plus integral (PI) computing unit 208, an adder 209, and an integrator 210.

The divider 207 divides the ineffective system voltage Vsq by the rated voltage amplitude V1* to determine a phase difference signal φs. The proportional plus integral (PI) computing unit 208 performs the PI (proportional plus integral) computation of the phase difference signal φs of the rotating coordinate system to output a frequency difference Δωs of the rotating coordinate system. The adder 209 adds the frequency deviation Δωs of the rotating coordinate system and a reference angular frequency ωs* of a fixed coordinate system to output an estimated frequency ωs. The integrator 210 integrates the estimated frequency ωs to output the control reference phase θ.

The reference angular frequency ωs* has been set beforehand.

The self-supporting control unit 200 of the embodiment shown in FIG. 1 has been explained on the premise that the dq transforming unit 201, the fluctuation detecting unit 202, the proportional computing unit 203, the fluctuation detecting unit 204, and the proportional computing unit 205 are composed of hardware.

However, the present invention is not limited to composing the self-supporting control unit 200 of the hardware. The present invention can also be realized by performing the respective computations, which the dq transforming unit 201, the fluctuation detecting unit 202, the proportional computing unit 203, the fluctuation detecting unit 204, and the proportional computing unit 205 perform, by computing programs (software) preset in a computer.

That is, in the embodiment utilizing the software, the self-supporting control unit 200 can be constructed as a computer being hardware in which computing programs (software) for performing computations required as a self-supporting control unit have been incorporated (set).

With the self-supporting control unit 200 according to the embodiment which utilizes software, the following computations are carried out by computing programs:

(1) A computation for performing dq transformation of the system voltage Vs is done to determine the effective system voltage Vsd and the ineffective system voltage Vsq.

(2) The effective system voltage Vsd determined is subjected to filtering, which involves differential computation and first-order lag computation, to determine the fluctuation component of the effective system voltage.

Furthermore, a computation for multiplying the determined fluctuation component of the effective system voltage by a gain is done to determine the ineffective current command $I_{refq}$.

(3) The ineffective system voltage Vsq determined is subjected to filtering, which involves first-order lag computation, to determine the fluctuation component of the ineffective system voltage.

Furthermore, a computation for multiplying the determined fluctuation component of the ineffective system voltage by a gain is done to determine the effective current command $I_{refd}$.

The ineffective current command $I_{refq}$ and the effective current command $I_{refd}$, determined in this manner by the computations using the computing programs, are outputted.

With the self-supporting control unit 200 according to the present embodiment, in determining the effective current command $I_{refd}$, redundancy of computation, i.e., the "integral" computation, followed by the "differential" computation, for restoring the initial state, is eliminated, and the computation load can be reduced. Simultaneously, computation by polar coordinate transformation can be cut down.

Moreover, the elimination of the differential computation enables noise resistance to be enhanced, and a gain to be increased.

Furthermore, in digitizing control (concretely, in exercising control by software processing using computing programs), cancellation of significant digits does not occur, because the "differential" computation can be omitted. In digitizing polar coordinate computation (concretely, in exercising control by software processing using computing programs), computation of $\tan^{-1}$ requires that solutions to inputs be prepared in a tubular form. In the present embodiment, however, polar coordinate computation is unnecessary. Thus, the computation load can be lessened, and digitization can be performed easily.

In addition, hardware necessary for computations can be cut down.

Next, an explanation for the equivalence between the circuit shown in FIG. 1 and the circuit shown in FIG. 5 will be presented by reference to FIGS. 2(a) to 2(d).

In FIGS. 2(a) to 2(d), members corresponding to those in FIG. 1 and FIG. 5 are assigned the same numerals as in FIGS. 1 and 5.

Figure 2A:
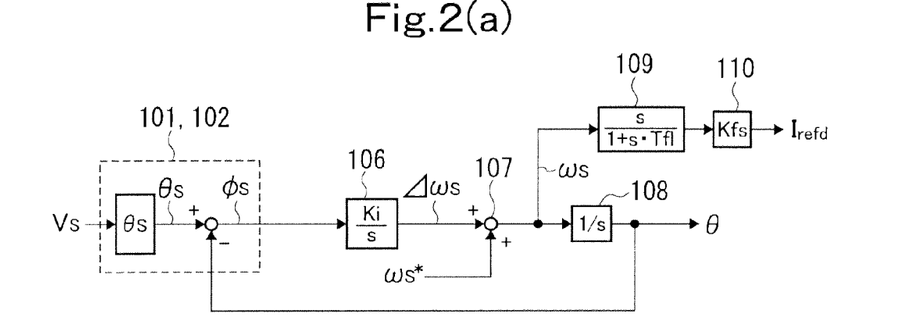
FIGS. 2(a) to 2(d) are block diagrams showing that the self-supporting control unit in the embodiment of the present invention is equivalent to the conventional self-supporting control unit shown in FIG. 5.

FIG. 2(a) shows only the system for determining the effective current command $I_{refd}$ in the self-supporting control unit 100 shown in FIG. 5. As the computing unit 106, an integrating amplifier is used alternatively.

Figure 2B:
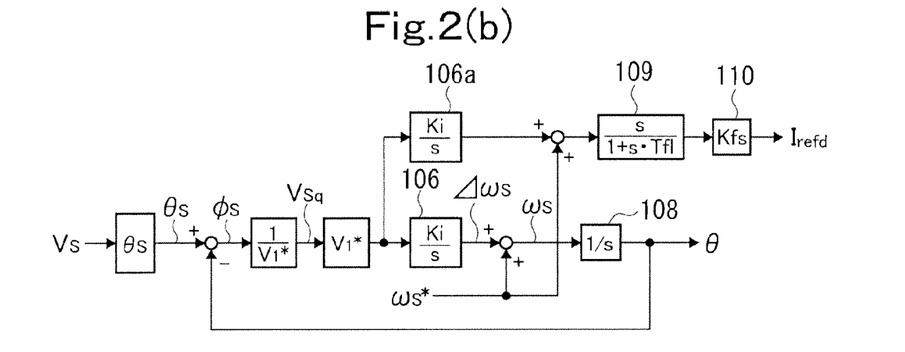

First, FIG. 2(a) is modified as indicated by FIG. 2(b). This modification comprises adding a block of the rated voltage amplitude V1* and a block of (1/V1*), and relocating the branch for the effective current command $I_{refd}$ in front of the computing unit 106.

Further, a summing point for adding the output of an integrating amplifier 106a and the reference angular frequency ωs* is added in order to achieve equivalence. Here, the constants, if differentiated, become zero. Thus, the summing point for computing the $I_{refd}$, namely, the summing point for adding the reference angular frequency ωs* (i.e., the added summing point), can be omitted.

Figure 2C:
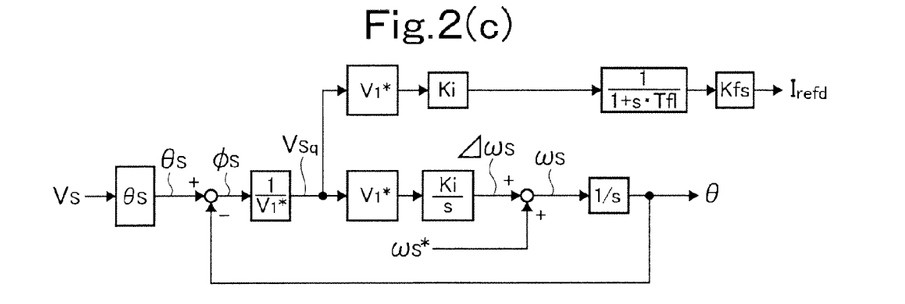

Since the integration of the integrating amplifier 106a and the differentiation of the fluctuation detecting unit 109 counterbalance each other, FIG. 2(b) can be modified as in FIG. 2(c).

Figure 2D:
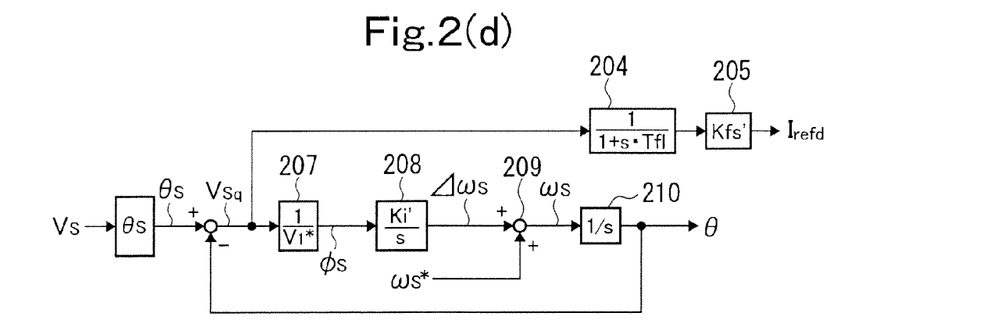

Then, the gains are put together, with the result that $$Kfs'=Kfs \cdot Ki/V1^*$$

$$Ki'=Ki/V1^*$$

whereby FIG. 2(d) is obtained.

Approximations are made here. The phase difference signal φs with respect to the control reference phase θ is given by the following equation:

$$\phi s=\tan^{-1}(Vsq/Vsd)$$

If PLL is in action, it can be considered in a steady state that Vsq≈0. Thus, the phase difference signal φs can be expressed by the following equation:

$$\phi s \approx Vsq/Vsd$$

If PLL is in action, the voltage amplitude signal |Vs|, in a steady state, can also be expressed in an approximate manner by the following equation:

$$|Vs|=(Vsd^2+Vsq^2)^{1/2} \approx Vsd$$

Provided that the voltage amplitude does not fluctuate greatly (fluctuates within the rating ±10%), an approximation can be made that the effective system voltage Vsd is nearly equal to the rated voltage amplitude V1*. Thus, the phase difference signal φs can be approximated at $$\phi s \approx Vsq/V1^*$$

Based on this equation, detection of θs and the rated voltage amplitude V1* in FIG. 2(d) can be replaced by the dq transformation of the system voltage Vs using the control reference phase θ. As noted here, FIG. 2(d) can approximate FIG. 1, and both are nearly equivalent.

DESCRIPTION OF THE NUMERALS

1 Power system, 2 Circuit breaker, 10 Distribution system, 11 Dispersed generation plant, 12 Load, 20 System stabilizing device, 21 Self-supporting control unit, 22 Interconnected control unit, 23 Change-over switch, 24 Current control unit, 25 PWM modulator, 26 Power converter, 27 Direct current charging unit, 28 Current detector, 29 Voltage detector, 30 Current detector, 40 Zero-crossing detecting unit, 41 Frequency converting unit, 42 Fluctuation detecting unit, 43 Integrator, 44 Voltage amplitude detecting unit, 45 Fluctuation detecting unit, 46 Proportional computing unit, 50 PLL circuit, 60 dq transformer, 61, 63 Subtracter, 62, 64 Current control unit, 65 dq inverse transformer, 200 Self-supporting control unit, 201 dq transforming unit, 202 Fluctuation detecting unit, 203 Proportional computing unit, 204 Fluctuation detecting unit, 205 Proportional computing unit, 206 PLL circuit, 207 Divider, 208 Proportional plus integral computing unit, 209 Adder, 210 Integrator, Vs System voltage, Vsd Effective system voltage, Vsq Ineffective system voltage, φs Phase difference signal, Δωs Frequency difference, ωs* Reference angular frequency, θ Control reference phase, $I_{refd}$ Effective current command, $I_{refq}$ Ineffective current command, g Gate signal.

The invention claimed is:

1. A system stabilizing device provided in a distribution system to which a dispersed generation plant and a load are connected,
   the system stabilizing device having a control mode for a self-supporting run, the control mode being such that as a frequency of a system voltage of the distribution system fluctuates, compensation for an active power supplied to the distribution system is made, and as a voltage amplitude of the system voltage of the distribution system fluctuates, compensation for a reactive power supplied to the distribution system is made,
   the system stabilizing device comprising:
   a self-supporting control unit which, in accordance with a fluctuation in the frequency of the system voltage, outputs an effective current command for suppressing the fluctuation in the frequency, and in accordance with a fluctuation in the voltage amplitude of the system voltage, outputs an ineffective current command for suppressing the fluctuation in the voltage amplitude; and
   a power converter which performs a converting action and an inverting action in accordance with a gate signal obtained based on the effective current command and the ineffective current command,
   the self-supporting control unit being composed of:
   a dq transformer which performs dq transformation of the system voltage to output an effective system voltage and an ineffective system voltage;
   a first fluctuation detecting unit which is composed of a filter having differential characteristics and first-order lag characteristics and detects a fluctuation component of the effective system voltage;
   a first proportional computing unit which multiplies the fluctuation component of the effective system voltage by a gain to output the ineffective current command;
   a second fluctuation detecting unit which is composed of a filter having only first-order lag characteristics without having differential characteristics and detects a fluctuation component of the ineffective system voltage; and
   a second proportional computing unit which multiplies the fluctuation component of the ineffective system voltage by a gain to output the effective current command.

2. A system stabilizing device provided in a distribution system to which a dispersed generation plant and a load are connected,
   the system stabilizing device having a control mode for a self-supporting run, the control mode being such that as a frequency of a system voltage of the distribution system fluctuates, compensation for an active power supplied to the distribution system is made, and as a voltage amplitude of the system voltage of the distribution system fluctuates, compensation for a reactive power supplied to the distribution system is made,
   the system stabilizing device comprising:
   a self-supporting control unit which, in accordance with a fluctuation in the frequency of the system voltage, outputs an effective current command for suppressing the fluctuation in the frequency, and in accordance with a fluctuation in the voltage amplitude of the system voltage, outputs an ineffective current command for suppressing the fluctuation in the voltage amplitude; and
   a power converter which performs a converting action and an inverting action in accordance with a gate signal obtained based on the effective current command and the ineffective current command,
   wherein the self-supporting control unit carries out computations using computing programs in such a manner as to:
   perform a computation for dq-transforming the system voltage to determine an effective system voltage and an ineffective system voltage;
   subject the effective system voltage to filtering, which involves a differential computation and a first-order lag computation, to determine a fluctuation component of the effective system voltage, and further perform a computation for multiplying the fluctuation component of the effective system voltage by a gain to determine the ineffective current command; and
   subject the ineffective system voltage to filtering, which involves a first-order lag computation, to determine a fluctuation component of the ineffective system voltage, and further perform a computation for multiplying the fluctuation component of the ineffective system voltage by a gain to determine the effective current command.

* * * * *